United States Patent
Rolland

[11] Patent Number: 5,667,254
[45] Date of Patent: Sep. 16, 1997

[54] DEVICE FOR CONNECTING A CONTAINER WALL WITH A PIPE

[75] Inventor: John Rolland, Moss, Norway

[73] Assignee: Kvaerner Moss Technology a.s., Lysaker, Norway

[21] Appl. No.: 537,883

[22] PCT Filed: May 11, 1994

[86] PCT No.: PCT/NO94/00092

§ 371 Date: Dec. 28, 1995

§ 102(e) Date: Dec. 28, 1995

[87] PCT Pub. No.: WO94/27074

PCT Pub. Date: Nov. 24, 1994

[30] Foreign Application Priority Data

May 14, 1993 [NO] Norway ................... 931776

[51] Int. Cl.$^6$ ................................................ F16L 21/00
[52] U.S. Cl. ................ 285/123.14; 285/192; 285/405; 285/288.2
[58] Field of Search ........................ 285/192, 138, 285/286, 405

[56] References Cited

U.S. PATENT DOCUMENTS

| | | | |
|---|---|---|---|
| 1,729,944 | 10/1929 | Hollowell | 285/192 X |
| 1,756,668 | 4/1930 | Sprankle | 285/192 X |
| 1,869,270 | 7/1932 | Morterud | |
| 2,711,841 | 6/1955 | Schaefer et al. | 285/192 X |
| 4,252,348 | 2/1981 | Kojima | |
| 5,022,430 | 6/1991 | Degooyer | |

FOREIGN PATENT DOCUMENTS

| | | |
|---|---|---|
| 866421 | 2/1953 | Germany . |
| 870310 | 7/1988 | Norway . |

*Primary Examiner*—Dave W. Arola
*Attorney, Agent, or Firm*—Birch, Stewart, Kolasch & Birch, LLP

[57] ABSTRACT

A device for connecting a container wall with a pipe which extends through the container wall. The device comprises a muff which is provided on the outside of the pipe. One end section of the muff is connected with the pipe and the container wall is connected with the muff at a point located at a distance from this end section. The one end section of the muff comprises a ring flange which is arranged for a sealing and releasable connection with a ring flange of the pipe.

5 Claims, 1 Drawing Sheet

DEVICE FOR CONNECTING A CONTAINER WALL WITH A PIPE

The invention relates to a device for connecting a container wall with a pipe which extends through the container wall, which device comprises a muff which is provided coaxially with and on the outside of the pipe, and one end section of which is connected to it, the container wall being connected with the muff at a point which is located at a distance from this end section.

BACKGROUND OF THE INVENTION

A device of the above-mentioned type is known in the prior art, arranged for use in connection with containers for liquid natural gas (LNG) where there is welded into the pipe an element comprising a first pipe section with the same internal diameter as the pipe, a section which extends radially outwards from this pipe section, and a second pipe section which has a larger diameter than the first pipe section and is connected to the radially extending section and extends coaxially in relation to it. The element's sections are constructed in one piece, e.g. by means of casting.

SUMMARY OF THE INVENTION

The object of the known device is to provide a connection wherein the mechanical stresses exerted are reduced in relation to those stresses which are exerted if, e.g., the pipe is directly welded to the container wall and the connection is exposed to the influence of heat or cold. However, very powerful transient stresses can occur.

In the known device, an extension pipe is welded to the second pipe section in order to obtain a sufficiently large reduction in stress, since it is this extension pipe which in turn is welded to the container.

Furthermore, a casing is provided coaxially inside the first pipe section, which casing is welded to the end flanges, which are welded to the first pipe section.

The production of the cast element is complicated and the connection requires a great many welding operations. Thus the quality control for the cast element, the components which are connected with this element, and the installation of the element involve elaborate processes. The connection therefore becomes time-consuming and expensive.

The object of the invention is to provide a device of the above-mentioned type which is encumbered to a lesser extent with the above-mentioned disadvantages.

BRIEF DESCRIPTION OF THE DRAWINGS

The invention will now be described in more detail with reference to the drawings which illustrates schematically two embodiments of the invention.

DETAILED DESCRIPTION OF THE EMBODIMENTS

Figure 1:
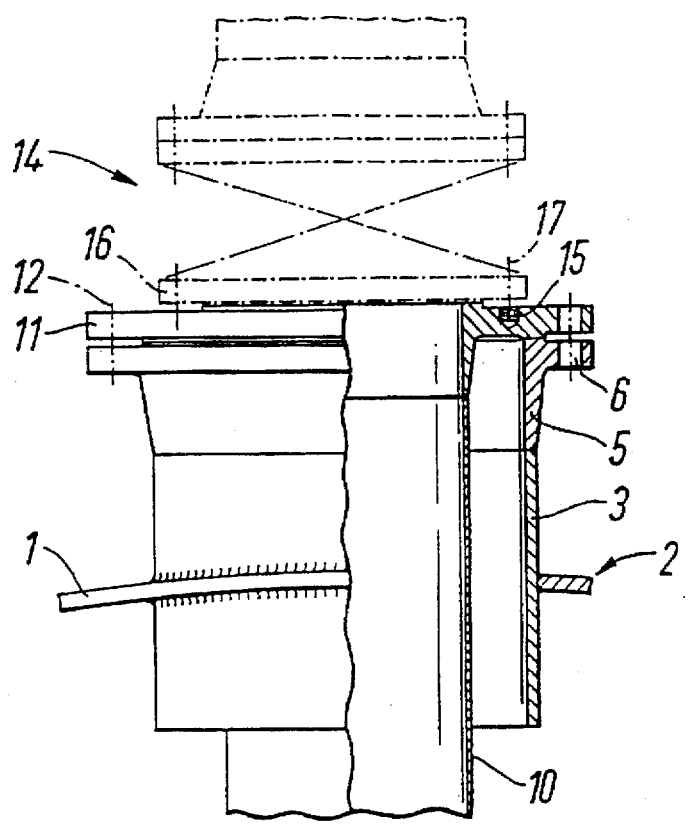
FIG. 1 is a partial side view of a first embodiment of the device according to the invention, and partly a longitudinal section through it, sections of the tank and an rated pipe system being cut away.

As is illustrated in FIG. 1, in a hole in the wall 1 of a container 2 there is welded a muff 3 whose longitudinal axis extends substantially perpendicular to the adjoining section of the container wall. To the end section of the muff 3 which is located outside the container, there is welded a first ring flange 5, the flange portion of which extends perpendicular to the muffs longitudinal axis, and which has a number of holes 6 for bolts.

Radially inside the muff there extends coaxially in relation to it a pipe 10 through which fluid can flow to or from the container. To the one end section of the pipe there is welded a second ring flange 11, the flange portion of which extends perpendicular to the pipe's longitudinal axis and which like the first flange is equipped with a number of holes for bolts. The flanges abut sealingly against each other and through pairs of mutually aligned holes of the flanges there are inserted respective bolts 12 which are illustrated at their center lines and which together with associated nuts (not shown) force the flanges towards each other.

For connecting a flange of an adjoining component 14 (indicated by dotted lines) of the pipe system of which the pipe 10 forms a part, the second flange 11 can have a number of threaded blind holes, into which screws 17 (indicated by their center lines) can be screwed for securing a flange 16 of this component 14.

By means of this device the use of cast special parts is avoided and the number of welding seams is reduced in relation to the known device.

Figure 2:
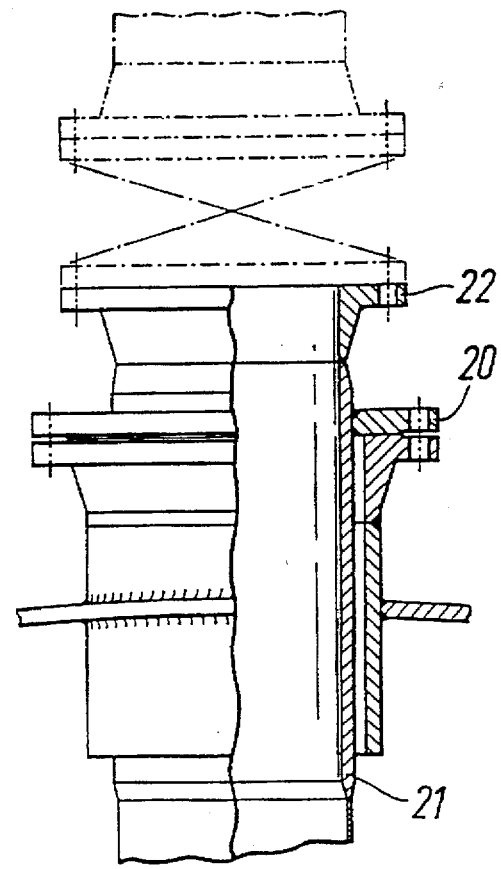
FIG. 2 is a partial side view of a second embodiment of a device according to the invention, and partly a longitudinal section through it, sections of the tank and an associated pipe system being cut away.

The difference between the device which is illustrated in FIG. 1 and that which is illustrated in FIG. 2 is that the flange 20 which is welded to the pipe 21, which is arranged to permit fluid to flow to and from the container, is not located at the end of the pipe, but at a distance from it. At the end of the pipe which thereby is located outside the container, there is welded a third flange 22 to which the other components of the pipe system, (illustrated by dotted lines) of which the pipe 21 forms a part, can be attached.

By means of the device according to the invention, acceptable mechanical stresses are achieved in the connection resulting from the effects of heat or cold exerted by the device.

The further object is achieved that pipes and flanges can be used which are standard items instead of specially made parts which are manufactured by means of casting or machining of metal blocks.

I claim:

1. A device for connecting a wall of a container for a liquid natural gas with a pipe which extends through the container wall, comprising a muff, which is provided coaxially with and on the outside of the pipe, having a first end section and a second end section, said first end section being fixedly connected with the container wall, a first ring flange fixedly connected with the second end section of the muff and disposed at a distance from the container wall, and a second ring flange fixedly connected with the pipe, wherein the first and second ring flanges are rigidly and abuttingly interconnected by connecting means.

2. The device according to claim 1, wherein the second ring flange is disposed at one end of the pipe and arranged for connection of the pipe with other components of a pipe system of which the pipe forms a part.

3. The device according to claim 1, wherein the connecting means includes a plurality of bolt structures.

4. A device for connecting a wall of a container for a liquid natural gas with a pipe which extends through the container wall, comprising a muff, which is provided coaxially with and on the outside of the pipe, having a first end section and a second end section, said first end section being fixedly connected with the container wall, a first ring flange fixedly connected with the second end section of the muff and disposed at a distance from the container wall, a second ring flange fixedly connected with the pipe, and a third ring flange fixedly connected with the pipe and disposed at a distance inward of an outer end of the pipe wherein the first and third ring flanges are rigidly and abuttingly interconnected.

5. The device according to claim 4, wherein the second ring flange is disposed at the outer end of the pipe and arranged for connection of the pipe with other components of a pipe system of which the pipe forms a part.

* * * * *